United States Patent [19]

Okino

[11] Patent Number: 5,754,214

[45] Date of Patent: May 19, 1998

[54] IMAGE EXPOSING APPARATUS USING OPTICAL SENSOR TO DETECT START SYNCHRONIZATION OF SCANNING LINE

[75] Inventor: Yoshiharu Okino, Kanagawa, Japan

[73] Assignee: Fuji Photo Film Co., Ltd., Kanagawa, Japan

[21] Appl. No.: 7,870

[22] Filed: Jan. 22, 1993

[30] Foreign Application Priority Data

Jan. 22, 1992 [JP] Japan ..................... 4-009388

[51] Int. Cl.⁶ ................... B41J 2/435; B41J 2/47; G01D 15/14; H01J 29/70
[52] U.S. Cl. .................... 347/229; 347/235; 347/243
[58] Field of Search ................ 324/76.77; 250/336.1, 250/338.4, 339; 347/225, 229, 235, 241, 243

[56] References Cited

U.S. PATENT DOCUMENTS

| | | |
|---|---|---|
| 4,404,571 | 9/1983 | Kitamura ..................... 347/235 |
| 4,962,312 | 10/1990 | Matuura et al. ............... 347/243 |
| 4,978,976 | 12/1990 | Okino ......................... 347/235 |
| 5,091,971 | 2/1992 | Ward et al. .................. 358/461 |

FOREIGN PATENT DOCUMENTS

A62-232682  9/1987  Japan.

*Primary Examiner*—Benjamin R. Fuller
*Assistant Examiner*—Raquel Yvette Gordon
*Attorney, Agent, or Firm*—Sughrue, Mion, Zinn, Macpeak & Seas, PLLC

[57] ABSTRACT

In the improved image exposing apparatus, light beams of different wavelengths in narrow bands that issue from a plurality of light sources are admitted into a light deflector at different angles and substantially the same main scanning line defined on a light-sensitive material is scanned sequentially at predetermined time intervals by the reflected and deflected light beams. The apparatus is so designed that only one light beam will be admitted into a start synchronizing sensor when start synchronization is to be effected. Thus, even if the beam intensity of any one of the rasters produced in a multi-beam varied angle incidence optical system is not significantly higher than the sensitivity of the start synchronizing sensor which is to perform line synchronization for individual rasters, the intended line start synchronization can positively be effected when a write (exposure) mode is performed on a color light-sensitive material by each raster, whereby the light-sensitive material can be effectively exposed to produce a satisfactory image without defects such as color mismatch.

8 Claims, 4 Drawing Sheets

FIG. 6  PRIOR ART

IMAGE EXPOSING APPARATUS USING OPTICAL SENSOR TO DETECT START SYNCHRONIZATION OF SCANNING LINE

BACKGROUND OF THE INVENTION

This invention relates to an image exposing apparatus, more particularly to an image exposing apparatus that uses a varied angle incidence optical system in which a plurality of light beams issuing from different light sources are allowed to fall on a rotating polygonal mirror at different angles so that beams of reflected light will scan sequentially over substantially the same scanning line on a light-sensitive material at predetermined intervals.

Image forming systems conventionally used to record and reproduce color image in printing, copying and other fields employ color light-sensitive materials whose spectral sensitivities are dependent on wavelengths. The color light-sensitive materials used on such image forming systems are exposed imagewise with image exposing apparatuses and in an increasing number of such image exposing apparatuses used today, three or four semiconductor lasers (or laser diodes, which are hereunder abbreviated as "LDs") or light-emitting devices such as light-emitting diodes (hereunder abbreviated as "LEDs") that issue light beams at predetermined wavelengths in narrow bands are employed as light sources.

To perform scanning and exposure with such color image exposing apparatuses, light beams deflected in the fast scan(main scanning) direction are applied to illuminate a light-sensitive material that is transported in the slow scan (subscanning) direction which is generally perpendicular to the fast scan direction. To scan and expose color light-sensitive materials, three primary colors, say, cyan (C), magenta (M) and yellow (Y) need be produced and, to this end, three light sources, say, three LDs are provided in such a way that they issue light beams at different wavelengths in narrow bands. Thus, when one exposes a light-sensitive material by scanning with the three light beams, it is necessary to have those beams travel over substantially the same main scanning line on the light-sensitive material. An image exposing apparatus used extensively to meet this need is such that the three light beams are combined into a single beam by means of dichroic mirrors, then allowed to be incident on a light deflector such as a rotating polygonal mirror, and reflected and deflected in the fast scan direction by a deflecting face so that the color light-sensitive material is exposed by a single focusing light beam that travels over the main scanning line. However, image exposing apparatuses of this type need to use expensive optical components such as dichroic mirrors; therefore, the number of parts, and hence, the machine size will increase to cause a substantial increase in the production cost. Another problem is that the mirrors will cause so much light attenuation that only insufficient exposure is given to the point where image is to be focused.

Under these circumstances, the applicant previously proposed an image exposing apparatus that employed a 3-LD varied angle incidence optical system in which three light beams issuing from three different light sources (LDs) provided in the same plane were admitted at different angles to be incident at substantially the same point on a deflecting and reflecting face of a rotating polygonal mirror, with the reflected and deflected beams being focused in different positions on substantially the same line (main scanning line) on a color light-sensitive material so that it was exposed by scanning at predetermined positional (or time) intervals (see Japanese Patent Application No. 232682/1987).

To perform exposure with that image exposing apparatus, three light beams are focused at different points on the same main scanning line on the light-sensitive material and they are scanned sequentially over the line at predetermined intervals (in terms of either position or time); hence, it is necessary to control the three LDs independently of one another as regards the timing of exposure (i.e., it is necessary to synchronize the start points of exposure by individual rasters). To meet this need, a start synchronizing sensor is currently employed that measures for each raster (scanning beam) the timing on which the raster starts exposure of one line on the light-sensitive material. This sensor is provided fixedly in a predetermined position that is on an extension of the main scanning line defined (drawn) on the light-sensitive material being transported in the slow scan direction and which lies outside but near the light-sensitive material or which is optically generally equivalent to that position. The sensor receives the respective light beams each time they pass over it, generates a start detection signal and controls the modulation start timing of each raster to achieve line start synchronization for each raster, namely, to insure that the write (exposure) start position will coincide between individual rasters.

Figure 5:
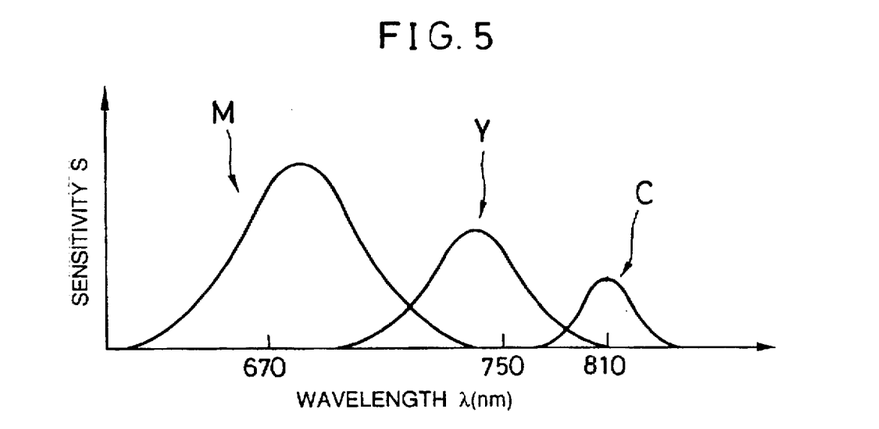
FIG. 5 is a graph showing an example of the spectral sensitivity characteristics of a light-sensitive material that is to be used in the present invention.
Figure 6:
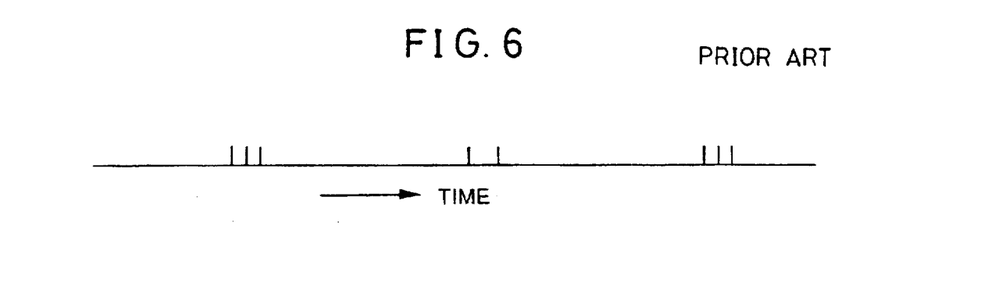
FIG. 6 is a timing chart that illustrates how the start sync signal detected by a conventional image exposing apparatus fluctuates.

However, as shown in FIG. 5, the sensitivity of a light-sensitive material varies for different colors (say, C, M and Y) and, hence, individual rasters will naturally have different beam intensities (optical powers). Therefore, if the beam intensity of a raster that performs exposure for a certain color is smaller than that for other colors in such a way that it is substantially equal to or near to or smaller than the sensitivity of the start synchronizing sensor, the sensor occasionally fails to detect that particular raster even if it passes over the sensor, with the result that no start detection signal is produced as output. Consequently, as shown in FIG. 6, the sensor will produce start detection signals in such an erratic way that the output covers all three colors on a certain occasion whereas it covers only two colors or even one color in other cases. This phenomenon causes the noise problem, leading to erroneous operations in detecting the start point for each raster. Thus, many problems have been involved in the conventional method of synchronizing starts points for a plurality of rasters by measuring an optical power for each raster.

BRIEF SUMMARY OF THE INVENTION

The present invention has been accomplished under these circumstances and has as an object providing an image exposing apparatus that is improved in that even if the beam intensity of any one of the rasters produced in a multi-beam varied angle incidence optical system is not significantly higher than the sensitivity of a start synchronizing sensor which performs line synchronization for individual rasters, the intended line start synchronization can positively be effected when a write (exposure) mode is performed on a color light-sensitive material by each raster, whereby the light-sensitive material can be effectively exposed to produce a satisfactory image without defects such as color mismatch.

To achieve the above-described object, there is provided by the present invention an image exposing apparatus comprising a plurality of light sources that emit light beams of different wavelengths in narrow bands at different angles, a light deflector that permits said plurality of light beams to be incident at substantially the same point on the same reflecting face at different angles and that causes the incident light beams to be reflected and deflected in the fast scan direction so that they scan sequentially at predetermined time intervals over substantially the same main scanning line defined on a light-sensitive material, an fθ lens for focusing said light beams on said main scanning line, an optical sensor for receiving said light beams that is disposed outside said light-sensitive material to achieve start synchronization for said main scanning line, and a start synchronizing beam selecting means that allows the single light beam from one of said plurality of light sources to be admitted into said optical sensor when start synchronization is to be achieved, said start synchronization being effected by the single light beam selected by said start synchronizing beam selecting means.

Preferably, said start synchronizing beam selecting means is so designed that when said apparatus is started up by turning on all of said light sources, said optical sensor will first detect said light beam having the largest optical power before the other light beams are turned out, and said light sources are disposed in such a way that the light beam having the largest optical power of said plurality of light beams will be admitted into said optical sensor earlier than the other beams.

Preferably, said start synchronizing beam selecting means is so designed that when said apparatus is started up by turning on all of said light sources, said optical sensor will not perform start synchronization until the optical powers of all of said light sources have reached the respective prescribed values, and that after said prescribed levels have been reached, all light sources except one are turned off and then the light beam from the remaining light source which is on is detected by said optical sensor.

Preferably, said start synchronizing beam selecting means is so designed that it permits only one of said plurality of light beams to be admitted into said optical sensor and said light deflector, said fθ lens or an obstacle is disposed between said light sources and said optical sensor in such a way that the other light beams will be blocked by at least one means selected from among the edge of a reflecting face of said light deflector, the edge of said fθ lens or said obstacle, whereby said other beams will not be admitted into said optical sensor.

Preferably, said optical sensor is a dual segmented sensor.

DETAILED DESCRIPTION OF THE INVENTION

According to its first aspect, the present invention provides an image exposing apparatus that uses a multi-beam varied angle incidence optical system in which light beams at different wavelengths in narrow bands that issue from a plurality of light sources are admitted into a light deflector at different angles. The reflected and deflected light beams scan sequentially at predetermined time intervals over substantially the same main scanning line defined on a light-sensitive material. The image exposing apparatus includes a start synchronizing beam selecting means that permits synchronizing the modulation of the leaser in correspondence with a selected beam of a single laser. To that effect, the apparatus is constructed so that the light beam having the largest optical power is permitted to reach a start synchronizing optical sensor earlier than any other light beams. Thus, this beam is selected by the beam selecting means to effect a start synchronizing signal. After the start synchronizing optical sensor has detected the earlier reaching light beam, the other light beams are turned out, and the individual beams perform line start synchronization on the light-sensitive material by a detection signal that is produced by said optical sensor only in response to the selected earlier arriving light beam.

According to its second aspect, the present invention provides an image exposing apparatus that uses the same multi-beam varied angle incidence optical system as in the first aspect except that the start synchronizing beam selecting means further includes means for determining whether all the lasers have reached their prescribed levels. According to this second embodiment, the start synchronizing signal produced by said optical sensor is neglected until the optical powers of the light beams from all light sources have reached their respective prescribed levels. After those levels have been reached, all light beams except one are turned out, and the individual beams perform line start synchronization on the light-sensitive material by said optical sensor which detects only said one light beam that is selected by said selecting means.

According to its third aspect, the present invention provides an image exposing apparatus that uses the same multi-beam varied angle incidence optical system as in the first aspect except that the start synchronizing beam selecting means includes a blocking means that allows only the last-coming of the plural light beams to be admitted into the optical sensor. The other beams that precede said last beam are blocked by the blocking means which can be a reflecting face of the light deflector, the edge of an fθ lens of an obstacle. Thus the individual beams perform line start synchronization on the light-sensitive material by said optical sensor which detects only said last light beam that is selected by said selecting means.

Thus, in whichever aspect, the present invention provides an image exposing apparatus that allows the start synchronizing light beam selecting means to produce at all times a start sync signal for only one light beam, whereby line start synchronization can be accomplished by a plurality of laser beams on a light-sensitive material in a correct and positive manner at all times. Consequently, the image exposing apparatus according to any aspect of the present invention is capable of reproducing at all times a satisfactory image that involves no defects such as color mismatch.

The image exposing apparatus of the present invention is described below with reference to the preferred embodiments shown in accompanying drawings.

Figure 1:
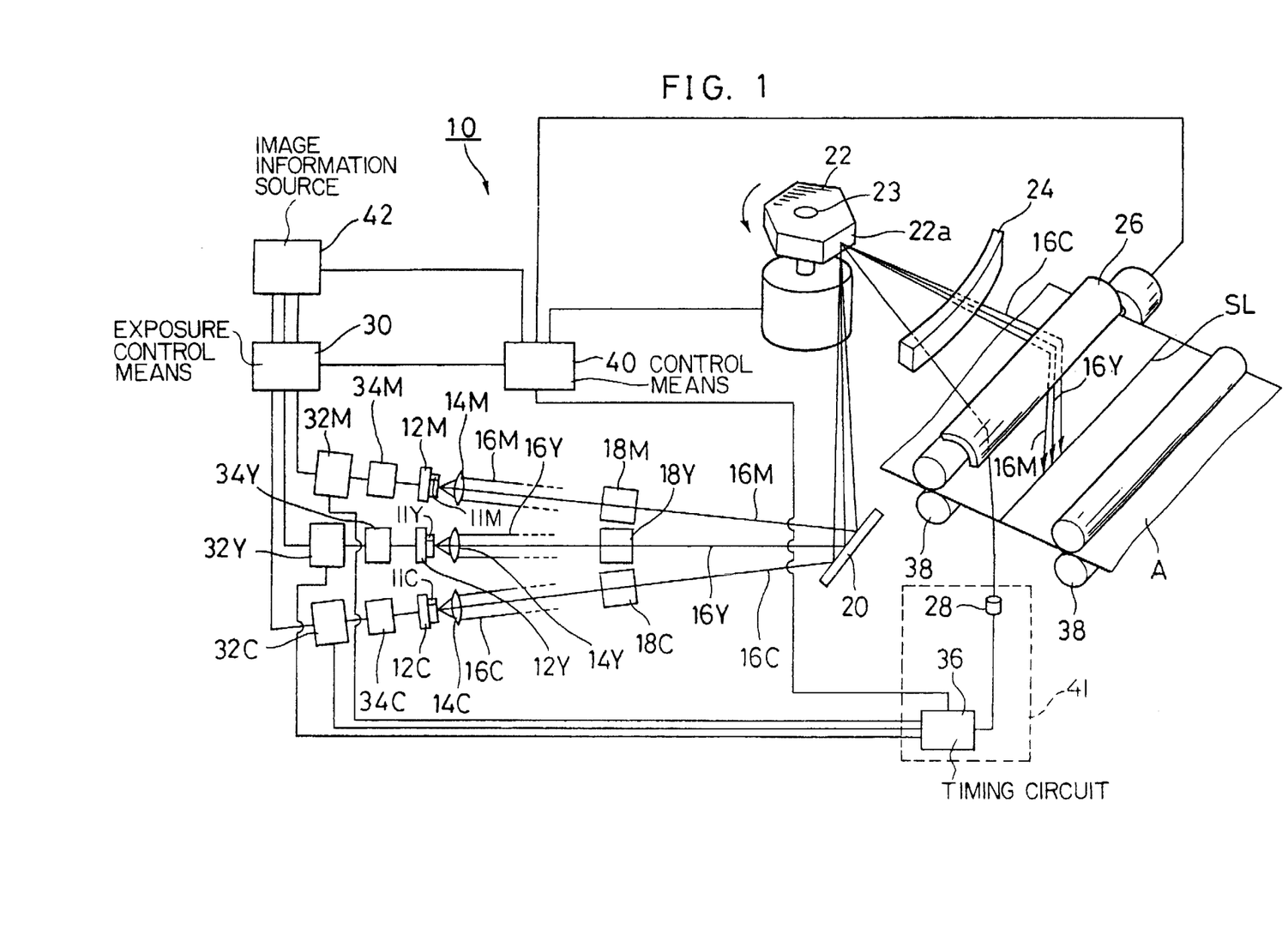
FIG. 1 is a diagram showing schematically an embodiment of the image exposing apparatus according to the present invention.

FIG. 1 is a perspective view showing schematically an embodiment of the image exposing apparatus. The apparatus shown in FIG. 1 is of a type that causes a full-color light-sensitive material to be exposed to light from three light sources, thereby producing a full-color image. The following description concerns a typical example of full-color image exposing apparatus which is adapted to form three primary colors, cyan, magenta and yellow, on a full-color light-sensitive material by means of three semiconductor lasers. However, the present invention is by no means limited to this particular example and four semiconductor lasers may be employed including one that is to form a black color.

As shown in FIG. 1, the image exposing apparatus generally indicated by 10 comprises: a 3 LD varied angle incidence scan exposing optical system having three semiconductor lasers (LDs) 12C, 12Y and 12M that issue light beams having predetermined narrow band wavelengths and optical powers for producing C (cyan), Y (yellow) and M (magenta) and which also have arranged in the direction of travel of light beams 16C, 16Y and 16M (as emitted from LDs 12C, 12Y and 12M), a plurality of collimator lenses 14C, 14Y and 14M, cylindrical lenses 18C, 18Y and 18M, a reflecting mirror 20, a polygonal mirror 22 rotatably mounted on shaft 33, and fθ lens 24 and a cylindrical mirror 26; a start detecting sensor 28 that receives at least light beam 16C to achieve line start detection; an exposure control system having an exposure control means 30 that receives an image information signal from an image information source 42 to determine the amount of exposure, modulation circuits 32C, 32Y and 32M for respective LDs 12C, 12Y and 12M, drive circuits 34C, 34Y and 34M for respective LDs 12C, 12Y and 12M, and a timing circuit 36 that receives a start detection signal from the start detecting sensor 28 to determine the timing on which the modulation circuits 32C, 32Y and 32M start modulation; a slow scan transport means 38 which transports a light-sensitive material A in the slow scan direction; and a control means 40 which controls polygonal mirror 22 in the scan exposing optical system, exposure control means 30 in the exposure control system, slow scan transport means 38, etc.

The 3 LD varied angle incidence optical system has three semiconductor lasers (LDs) 12C, 12Y and 12M as light sources that emit light at predetermined wavelengths in narrow bands and which cause respective light beams to be incident on a reflecting face 22a of the polygonal mirror 22 at slightly varied angles. In a typical case, LD 12C may be a semiconductor laser that emits light beam 16C at wavelength 810 nm for causing the cyan dye in the light-sensitive material A to produce a cyan color; LD 12Y may be a semiconductor laser that emits light beam 16Y at wavelength 750 nm for causing the yellow dye in the light-sensitive material A to produce a yellow color; and LD 12M may be a semiconductor laser that emits light beam 16M at wavelength 670 nm for causing the magenta dye in the light-sensitive material A to produce a magenta color.

In the apparatus shown in FIG. 1, LDs 12C, 12Y and 12M are disposed in such a way that light beam 16C will travel faster than the other two beams, which will then travel on the main scanning line SL in the order of 16Y and 16M. It should be noted here that the light-sensitive material A has different sensitivities for producing different colors and may be such that the sensitivity for forming color C is the lowest in the wavelength range centering at 810 nm as shown in FIG. 5. Therefore, in the first aspect of the present invention, an LD that emits at wavelength 810 nm to produce the largest optical power is used as LD 12C which produces color C for the formation of which the light-sensitive material A has the lowest sensitivity, so that it will emit light beam 16C that travels faster than any other beams.

Collimator lenses 14C, 14Y and 14M will shape the beams 16C, 16Y and 16M emitted from LDs 12C, 12Y and 12M, respectively, to produce parallel rays. The cylindrical lenses 18C, 18Y and 18M, fθ lens 24 and the cylindrical mirror 26 combine together to form a tilt correcting optical system that can correct any tilt in the polygonal mirror 22. In the embodiment under consideration, LDs 12C, 12Y and 12M are disposed in such a way that laser beams 16C, 16Y and 16M emitted from those lasers will be incident on a reflecting face 22a of the polygonal mirror 22 at slightly varied angles, with the reflected beams being focused in different positions on the same main scanning line SL on the light-sensitive material A, thereby scanning over the same scan line SL at suitable time intervals. Therefore, the purpose of the reflecting mirror 20 is to change the optical paths of laser beams 16C, 16Y and 16M so that they will be incident in proximate positions or at the same point on the same line running across the reflecting face 22a of the polygonal mirror 22. Since LDs 12C, 12Y and 12M can be disposed in close proximity to one another, they may be mounted on the same support (e.g. a heat dissipating plate) together with the associated collimator lenses 14C, 14Y and 14M.

The fθ lens 24 is used to insure that laser beams 16C, 16Y and 16M will be focused correctly in any position on the main scanning line SL. This lens is so corrected that chromatic aberration that will develop with light at wavelengths of 670 nm, 750 nm and 810 nm is limited within a permissible range. As already mentioned, the cylindrical mirror 26 combines with the cylindrical lenses 18C, 18Y and 18M and fθ lens 24 to form the tilt correcting optical system; in addition, it bends down laser beams 16C, 16Y and 16M so that they will be directed towards the main scanning line SL which is generally perpendicular to the slow scan direction of the light-sensitive material A which is to be transported in that direction by the slow scan transport means 38.

The start detecting sensor 28 is mounted in a position that is upstream of an extension of the main scanning line SL defined on the light-sensitive material A, which is outside but near the light-sensitive material A and which is to be passed by at least one of laser beams 16C, 16Y and 16M. The sensor 28 may be of any type that is capable of receiving laser beam 16C, 16Y or 16M when at least one of them, say, the first coming beam 16C in the first and second aspects of the present invention or the last coming beam 16M in the third aspect, passes over the sensor and which outputs the result of that reception as a start detection signal. To mention a few examples, light-receiving devices such as a photodiode and a phototransistor, or light detecting sensors using those light-receiving devices may be employed.

Figures 2A, 2B:
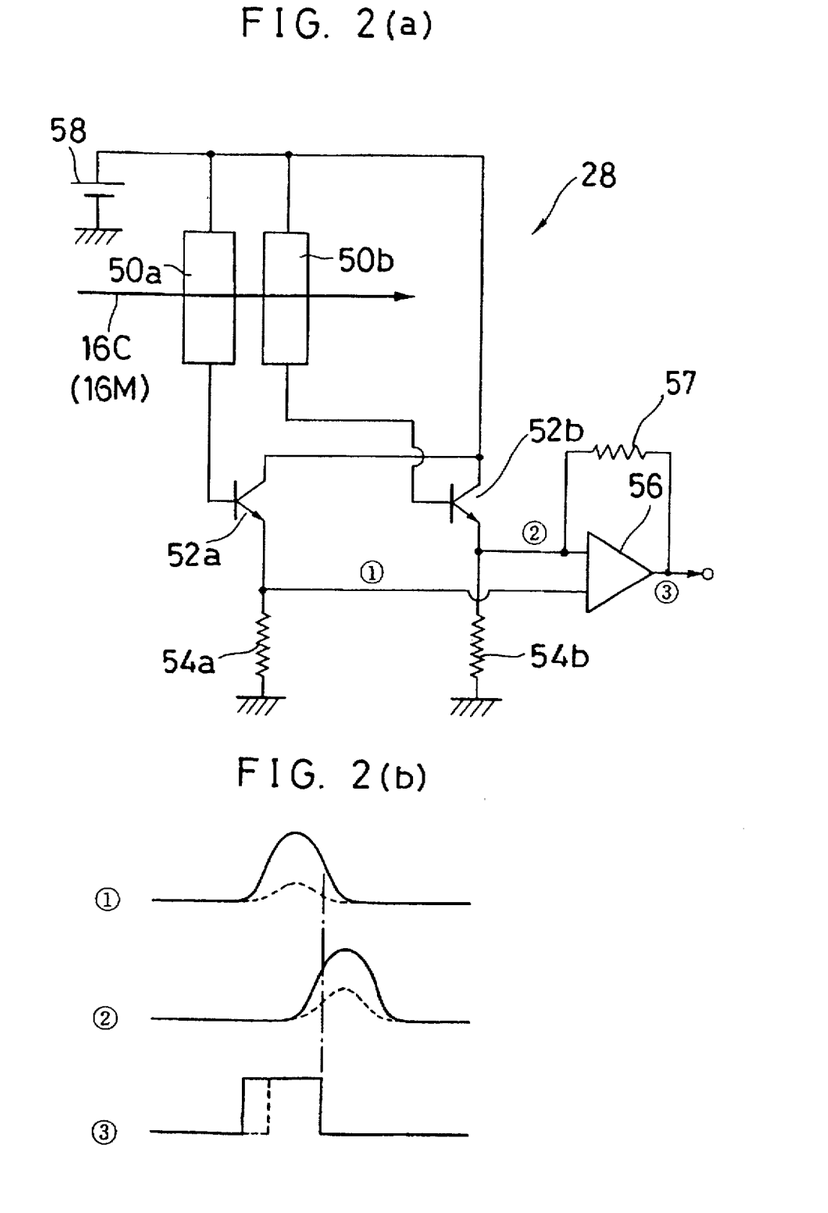
FIG. 2(a) is a circuit diagram showing an example of the start detecting sensor that is to be used in the image exposing apparatus shown in FIG. 1.
FIG. 2(b) is a timing chart for various parts of the sensor circuit.

An assembly that uses a dual segmented sensor is preferably employed as the light detecting sensor 28. An example of light sensor assembly 28 that uses a dual segmented sensor is shown in FIG. 2(a). As shown, the sensor assembly 28 comprises: a dual segmented sensor composed of two identical light-receiving devices 50a and 50b that are juxtaposed in close proximity (say, up to 100 µm) in such a way that the direction of segmentation is perpendicular to the travel of laser beam 16C (or 16M); two identical reception signal amplifying transistors 52a and 52b that have their base electrodes connected to ends of the respective light-receiving devices 50a and 50b; resistors 54a and 54b that are connected to the emitter electrodes of the respective transistors 52a and 52b; a comparator 56 that is connected to the emitter electrodes of transistors 52a and 52b; and a power supply 58 that is connected both to the other ends of light-receiving devices 50a and 50b and to the collector sides of transistors 52a and 52b. The other ends of resistors 54a and 54b are grounded, so is the negative electrode of power supply 58.

The light sensor 28 is so designed that when laser beam 16C passes over the light-receiving devices 50a and 50b in the dual segmented sensor, they will vary in resistance upon light reception and the resulting changes in their resistance are converted to a current by means of transistors 52a and 52b, with voltage drop being caused by resistors 54a and 54b. Output signals ①, ② from the respective transistors 52a and 52b may typically have waveforms as indicated by ① and ② in FIG. 2(b). Since laser beam 16C passes over the light-receiving device 50a earlier than 50b, the output signal D will rise first to reach a peak. At that time the output signal ② is not yet to rise, so the difference signal between output signals ① and ② is equal to output signal ①; when this difference signal exceeds a predetermined threshold level, the output signal ③ from the comparator 56 will rise stepwise and will remain in that state as long as the output signal ① is greater than output signal ② (namely, the difference signal ①-② is positive). Since the gap between light-receiving devices 50a and 50b is smaller than the spot size of laser beam 16C, the beam is first received by both devices 50a and 50b but an increasing portion of it will be received by device 50b as it travels downstream. Hence, by the time the output signal ① from device 50a falls, the output signal ② from device 50b has risen and when the center of laser beam 16C is shifted from device 50a to 50b, the voltage of output signal ① becomes smaller than that of output signal ②, whereupon the difference signal ①-② assumes a negative value, causing the output signal ③ from comparator 56 to fall stepwise. The timing of this stepwise fall is constant and independent of the spot size of laser beam 16C. The output signal ③ from comparator 56 is a start detection signal and the timing of its fall is the timing of laser beam detection. It should be mentioned here that a hysteresis characteristic is preferably provided by inserting a resistor 57 in the circuit so as to stabilize the output that is produced in the absence of light. In other words, the result of comparison is at "low level" in the absence of light and "high level" is attained only after output signal ① has exceeded signal ② by a predetermined degree.

Any variations in sensitivity that occur from one lot of light-sensitive materials to another as a result of change of light-sensitive material A or any time-dependent variations in sensitivity of a particular light-sensitive material A are corrected by changing the intensity of light beam accordingly. However, even in this case, the use of light sensor assembly 28 employing the dual segmented sensor described above offers the following advantage: even if output signals ① and ② have such low peaks that the timing on which the difference signal ①-② exceeds a predetermined threshold level is delayed as shown by dashed lines in FIG. 2(b), the timing on which the absolute value of the difference signal ①-② is changed from positive to negative is invariable and, hence, a correct start detection signal can be produced at all times.

The timing on which the output signal ③ falls is constant and independent of the spot size of laser beam 16C or the magnitude of the optical power of that laser beam and, especially, compared to an optical sensor that uses only one light-receiving device, possible variations in performance are extremely small and very correct sensing is assured.

The timing circuit 36 receives a start detection signal as detected by the optical sensor 28 which uses either the first coming laser beam 16C in the first and second aspects of the present invention or the last coming laser beam 16M in the third aspect and it will supply the respective modulation circuits 32C, 32Y and 32M with line start sync signals, namely signals indicative of the timing on which three laser beams 16C, 16Y and 16M will actually start to write image on the light-sensitive material A (i.e., start imagewise exposure). The timing circuit 36 combines with the start detecting sensor 28 to constitute the start synchronizing sensor. It should be noted here that on account of the distance between the position of installation of the start detecting sensor 28 and the line start position on the light-sensitive material A (the line write start position), the distance between laser beams 16C, 16Y and 16M on the main scanning line as determined by the placement of LDs 12C, 12Y and 12M, and the fast scan speed as determined by the rotational speed of polygonal mirror 22, the optical pathlength, etc., the time from the moment at which the first coming laser beam 16C or the last coming laser beam 16M has passed over the start detecting sensor 28 (namely, the outputting of the start detection signal) to the arrival of individual laser beams 16C, 16Y and 16M at the line start position on the light-sensitive material A is constant for each laser beam. Needless to say, laser beams 16C, 16Y and 16M scan the light-sensitive material A for exposure at predetermined intervals and, hence, the above-mentioned constant value is varied from one laser beam to another. Hence, the timing circuit 36 may well be regarded as a delay circuit which, upon receiving a start detection signal from the optical sensor 28, effects delay for the duration of said constant time interval for each laser beam so that the line sync signal for each of the laser beams 16C, 16Y and 16M is supplied as output to modulation circuits 32C, 32Y and 32M, respectively. The timing circuit 36 may be omitted if a delay circuit of the type just described above is incorporated in each of the modulation circuits 32C, 32Y and 32M. The delay times for the respective modulation circuits may be controlled by control means 36 in such a way that they will change in accordance with the variations in the fast scan speed.

The exposure control means 30 receives an image information signal from the image information source 42, performs various operations for correcting the amount of exposure and processing signals in accordance with the received image information signal, computes the amount of exposure of pixels of one line for each of the colors to be produced, and determines the amount of exposure of pixels of one line for each of the LDs 12C, 12Y and 12M. The image information source 42 may be of any type that is selected from among an image reading system, a computer and an image processing system such as video equipment or optical disk equipment.

Modulation circuits 32C, 32Y and 32M receive line start sync signals for individual beams 16C, 16Y and 16M which have been generated by the timing circuit 36 in response to the start detection signal detected by the start detecting sensor 28 and, in accordance with the amounts of exposure of pixels of one line that have been determined by the exposure control means, those modulation circuits will perform pulse width modulation on the light emission from LDs 12C, 12Y and 12M within a pixel period. When performing pulse width modulation by the image exposure method under consideration, the optical powers of the respective light source LDs (12C, 12Y and 12M) are preset at fixed values by the exposure control means 30, etc, so that the time durations of continuous light emission from LDs 12C, 12Y and 12M (i.e., the durations of continuous exposure) will be supplied as output to the respectively associated drive circuits 34C, 34Y and 34M within one pixel period for each pixel. If the amount of exposure of a certain pixel with a certain color is written as E, with the optical power of the LD for that color being written as P and the time duration of light emission from the LD (i.e., exposure time) as t, the following relation will hold: E=P×t. In the case of pulse with modulation where the optical power P is constant, the time duration of continuous exposure t can be expressed by E/P. Therefore, modulation circuits 32C, 32Y and 32M will supply the associated drive circuits 34C, 34Y and 34M with the respective time durations of continuous exposure $t_C, t_Y$ and $t_M$ as output signals for each pixel.

Figure 3A:
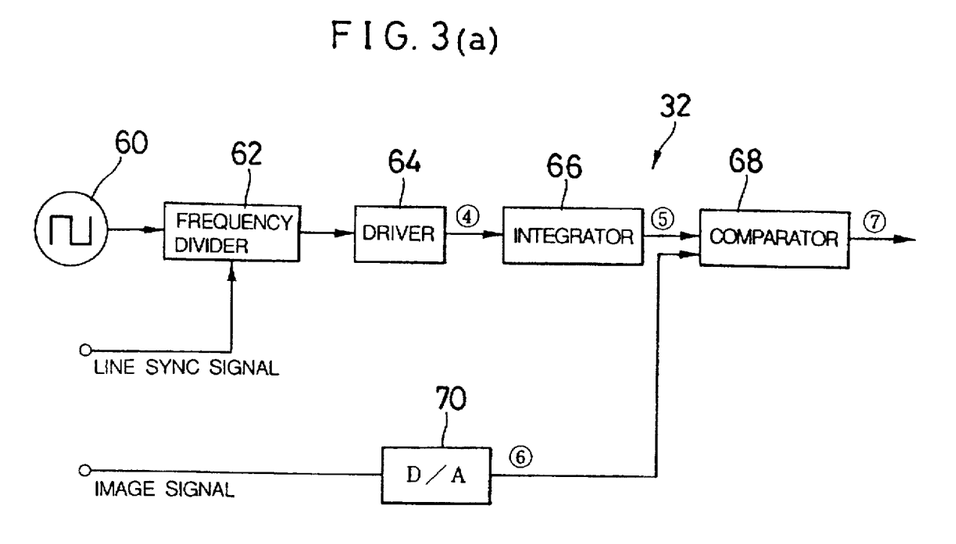
FIG. 3(a) is a block diagram showing an example of the modulating circuit for the semiconductor lasers to be used in the image exposing apparatus shown in FIG. 1.
Figure 3B:
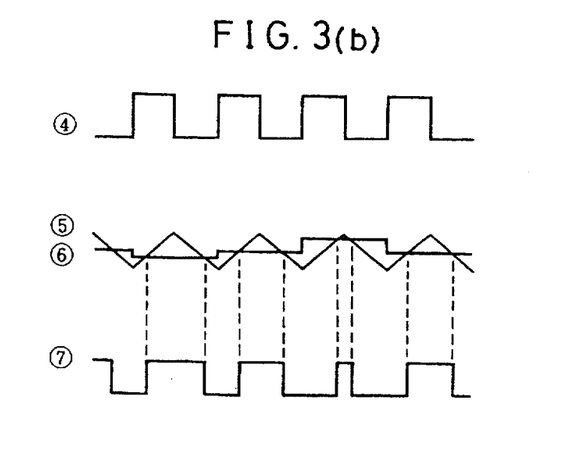
FIG. 3(b) is a timing chart for various parts of the modulating circuit.

A block diagram showing an example of each modulation circuit 32 (32C, 32M or 32Y) is shown in FIG. 3(a). As shown, the modulation circuit 32 is composed of a crystal oscillator 60, a frequency divider 62, a driver 64, an integrator 66, a comparator 68 and a D/A converter 70. In the modulation circuit 32, a reference clock signal generated from the crystal oscillator 60 is frequency divided by the divider 62 for a pixel period. The frequency divider 62 is supplied with a line start sync signal from the timing circuit 36 and the clock signal will be produced as an output signal having the waveform shown by ④ in FIG. 3(b) which is synchronous with said line sync signal and which has a pixel period. Therefore, in the example shown in FIG. 3(a), the crystal oscillator 60 and the frequency divider 62 combine together to constitute a circuit that will generate a clock in synchronism with the pixel period. The clock output synchronous with the pixel period [see the waveform ④ in FIG. 3(b)] has the voltage amplitude companded (compressed and expanded) by the driver 64 and enters the integrator 66 to generate a triangular wave as shown by ⑤ in FIG. 3(b). The triangular wave is then fed into the comparator 68. In a separate step, a digital image signal supplied into the D/A converter 70 is transformed to a voltage proportional to the image density [see the waveform ⑥ in FIG. 3(b)], which is supplied as the other input signal to the comparator 68. In the comparator 68, the triangular wave ⑤ is compared with the voltage ⑥ proportional to the image density and, as shown by ⑦ in FIG. 3(b), pulses indicative of the LD light emission time (t) proportional to that image density will be supplied as output to the relevant LD drive circuit (34C, 34M or 34Y). In this way, the modulation circuit 32 performs pulse width modulation on the incoming digital image signal.

Drive circuits 34C, 34Y and 34M are used to drive LDs 12C, 12Y and 12M, respectively. In pulse width modulation, these drive circuits will supply LDs 12C, 12Y and 12M with drive currents $I_C$, $I_Y$ and $I_M$ in association with the optical powers $P_C$, $P_Y$ and $P_M$ preset for the respective LDs during the time periods $t_C$, $t_Y$ and $t_M$ which have been determined by the modulation circuits 32C, 32Y and 32M, respectively. As a consequence, LDs 12C, 12Y and 12M will emit light with the optical powers preset for the respective LDs during the time periods $t_C$, $t_Y$ and $t_M$ which have been determined for the respective LDs in association with the ith pixel. This is accomplished over one line of pixels, whereupon LDs 12C, 12Y and 12M will perform exposure for one line.

Control means 40 will control the operation of the image exposing apparatus 10. Stated more specifically, it controls the rotational speed of polygonal mirror 22 (hence, the fast scan speed), the transport speed of the slow scan transport means 38 which transports the light-sensitive material A in the slow scan direction, the timing on which one line of image information signals will be fed from the image signal source 42 to the exposure control means 30, the timing of light emission from LDs 12C, 12Y and 12M (pixel clock timing or modulation timing), etc, or alternatively, the means 40 will perform the various kinds of control necessary for the image exposing apparatus in response to various signals.

In the image exposing apparatus 10 according to the first aspect of the present invention, the laser beam 16C which comes the first of the plurality of beams travelling on substantially the same main scanning line is selected by the start synchronizing beam selecting means as a light beam having the largest power, say, a light beam having the largest power corresponding to the color for which the light-sensitive material A has the lowest sensitivity, and when the start detecting sensor 28 is traversed by the laser beam 16C having the largest optical power to produce a start detection signal as output, the ensuing two light beams 16Y and 16M are turned out. Control for turning out the ensuing beams 16Y and 16M (namely, turning off LDs 12Y and 12M) when the start detecting sensor has detected the line start may be accomplished by the timing circuit 36 or the control means 40. If desired, the combination of the control means 40 and the exposure control means 30 may be employed to perform the necessary control.

With the start synchronizing beam selecting means designed in the manner described above (e.g. box 41), the start detecting sensor 28 will let only one light beam pass per cycle of fast scanning and since this passing beam has the largest power, only one start detection signal will positively be produced without causing any of the problems encountered in the prior art such as the number of start detection signals taking on the value 3 or 2 in one raster or the value 1 in another raster. In its first aspect, the present invention may be implemented in the following way. Before starting imagewise exposure of the light-sensitive material A, all LDs 12C, 12Y and 12M are turned on and their powers are raised slowly to predetermined (prescribed) levels. At the same time, the polygonal mirror 22 is caused to rotate up to a prescribed value of rotational speed. If the optical sensor 28 detects the passage of laser beam 16C, LDs 12Y and 12M are turned off so that other laser beams 16Y and 16M will not traverse the sensor 28. In this way, the powers of LDs 12C, 12Y and 12M and the rotational speed of polygonal mirror 22 reach the respective prescribed values. If, at that time, laser beam 16C has a sufficient optical power for the sensitivity of optical sensor 28, a single start detection signal can be detected in a precise and positive manner even if the optical powers of laser beams 16Y and 16M are below the sensitivity of sensor 28. Thus, line synchronization of the three laser beams 16C, 16Y and 16M can positively be performed whenever one starts imagewise exposure of the light-sensitive material A.

In the image exposing apparatus 10 according to the second aspect of the present invention, the result of start detection with the sensor 28 that is produced while the optical powers of LDs 12C, 12Y and 12M are raised to prescribed values prior to the start of exposure of the light-sensitive material A is neglected even if a start detection signal is delivered as output; only after the powers of three laser beams 16C, 16Y and 16M have reached prescribed levels, the light beam for a particular color is kept on while the other beams are turned out and the start detection signal delivered upon operating the sensor 28 in that situation is rendered effective. In this way, exposure may be started with intended line synchronization being achieved between the three laser beams 16C, 16Y and 16M.

The fact that the optical powers of LDs 12C, 12Y and 12M have reached the prescribed values may be sensed by the light-receiving devices 11C, 11Y, 11M incorporated as members making pairs with the associated LDs for controlling optical power, and the results of sensing are transmitted either to the timing circuit 36 or the modulation circuit 32 (32C, 32Y or 32M) or to the control means 40 so as to disregard the signal from the optical sensor 28 or regard it as "effective". After the powers of all LDs have reached the prescribed values, only one laser beam is kept on while the two others are turned out and this may be accomplished by the timing circuit 36, the modulation circuit 34 or the control means 40. The only one laser beam that is to be kept on may be any one of the beams 16C, 16Y and 16M but, preferably, the laser beam having the largest possible power is kept on. In the image exposing apparatus according to the second aspect of the present invention which is designed in the manner described above, start detection is performed with only one laser beam after the powers of all laser beams emitted have reached the prescribed levels and, hence, line synchronization of the three laser beams 16C, 16Y and 16M can positively be accomplished when starting imagewise exposure of the light-sensitive material A.

Figure 4:
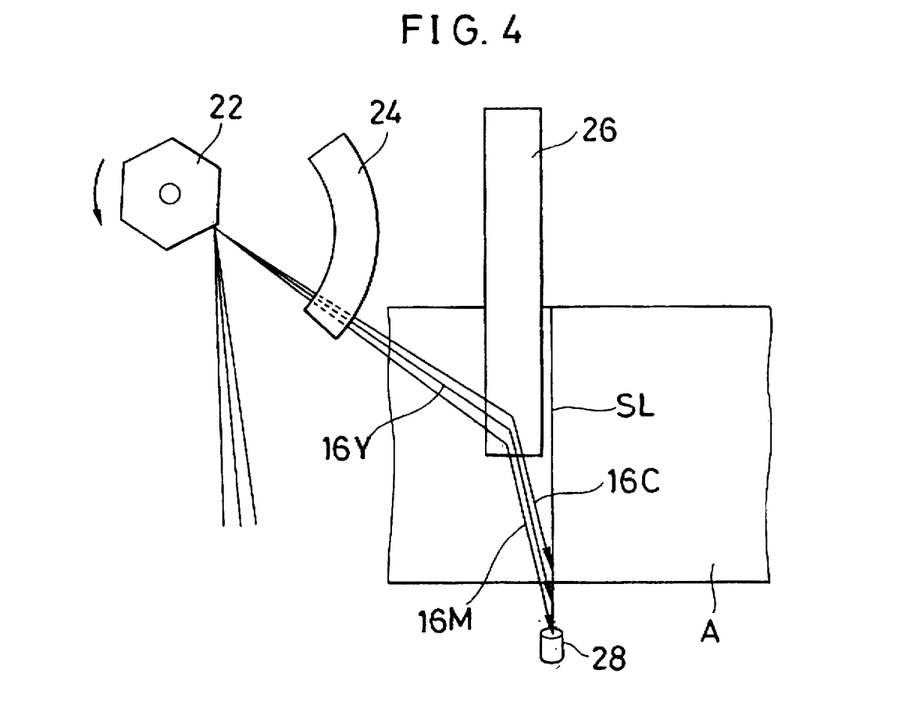
FIG. 4 is a diagram showing schematically another embodiment of the image exposing apparatus according to the present invention.

Permitting three laser beams 16C, 16Y and 16M to be incident on the polygonal mirror 22 at different angles presents the following problem. As shown in FIG. 4, when the three laser beams fall on the edge of the polygonal mirror 22 or the fθ lens 24, the regions (effective scan areas) where those beams are correctly focused on the light-sensitive material A and its extension are different and offset at predetermined spacings. Hence, in the image exposing apparatus 10 according to the third aspect of the present invention, the optical arrangement of the polygonal mirror 22, fθ lens 24 and start detecting sensor 28 relative to LDs 12C, 12Y and 12M is designed in such a way as shown in FIG. 4: namely, first reaching two beams 16C and 16Y will be focused at positions inward of the sensor 28 (closer to the light-sensitive material A) when they have fallen on the edge of polygonal mirror 22 or fθ lens 24 whereas only the last coming beam 16M will be correctly focused on the sensor 28. Alternatively, an obstacle may be provided to attain the same purpose. In this way, line start detection for only the last coming laser beam 16M can positively be performed at all times.

In the apparatus shown in FIGS. 1 and 4, three LDs 12C, 12Y and 12M are arranged in such a way that the light-sensitive material A is scanned for exposure by three laser beams in the order of 16C, 16Y and 16M. It should, however, be noted that the order of scanning by those laser beams is in no way limiting and they may scan the light-sensitive material A in any other order. In the apparatus shown in FIGS. 1 and 4, three laser beams are emitted to form three primary colors C, M and Y but the present invention is in no way limited to this particular case and four laser beams may be emitted to produce four colors including black (BL) or, alternatively, three laser beams may be emitted to form another set of three colors. Further, in the apparatus shown in FIGS. 1 and 4, three laser beams are emitted from three LDs but this is not the sole case of the present invention and two LDs may be used to emit two laser beams, with the beam issuing from one LD being split into two beamlets, thereby producing three laser beams in total.

As described on the foregoing pages, the present invention relates to improvements of an optical system that allows a plurality of light beams to be incident at varied angles for performing line start synchronization of those beams as they travel on a light-sensitive material and its extension. In the first aspect of the invention, the start synchronizing sensor detects the first coming beam having the largest optical power and then one insures that the ensuing beams are turned out. In the second aspect, the output of the sensor in response to the passage of the three beams is neglected until the rated optical powers are reached and after the rated values are attained, only the first coming beam is kept on while the other beams are turned out. In this manner, a start sync signal for only the first coming beam can be produced from the start synchronizing sensor at all times. In the third aspect, either at least one optical device as selected from among the light sources, the light deflector such as a polygonal mirror, the fθ lens and the start synchronizing sensor or an obstacle is disposed in an optically appropriate manner so that all beams except the last coming beam will be blocked either by the edge of said optical device or by the obstacle so that they fail to pass over the sensor whereas only the last coming beam can pass over said sensor. Thus, in the third aspect, a start sync signal for only the last coming beam can be produced at all times. Therefore, in either of the three aspects of the present invention, line start synchronization can be accomplished by a plurality of laser beams on a light-sensitive material in a correct and positive manner at all times and, consequently, the image exposing apparatus according to any aspect is capable of reproducing at all times a satisfactory image that involves no defects such as color mismatch.

What is claimed is:

1. An image exposing apparatus for scanning an image on a light-sensitive material having a main scanning direction, and having a plurality of light sources that turn on or off, comprising:

a light deflector having a plurality of faces;

said plurality of light sources emit light beams of different wavelengths in narrow bands so as to be incident at different angles but at substantially a single location on one of said reflecting faces of said light deflector, the incident light beams being reflected and deflected to scan sequentially at predetermined time intervals in the main scanning direction and to thereby define a main scanning line;

an fθ lens for focusing said light beams on said main scanning line; and an optical sensor for receiving said light beams when said light beams are disposed outside said light-sensitive material to achieve start synchronization for said main scanning line;

wherein said light sources are arranged to allow the light beam having largest optical power of said plurality of light beams to be admitted into said optical sensor earlier than the other light beams, and when said plurality of light sources turned is on, said optical sensor will first detect said light beam having the largest optical power to effect start synchronization before the other light beams are turned off.

2. An image exposing apparatus for scanning an image on a light-sensitive material having a main scanning direction, and having a plurality of light sources that turn on or off, comprising:

a light deflector having a plurality of faces;

said plurality of light sources emit light beams of different wavelengths in narrow bands so as to be incident at different angles but at substantially a single location on one of said reflecting faces of said light deflector, the incident light beams being reflected and deflected to scan sequentially at predetermined time intervals in the main scanning direction and to thereby define a main scanning line;

an fθ lens for focusing said light beams on said main scanning line; and an optical sensor for receiving said light beams when said light beams are disposed outside said light-sensitive material to achieve start synchronization for said main scanning line;

wherein, when said apparatus is started up by turning on all of said light sources, said optical sensor will not perform start synchronization until optical powers of all of said light sources have reached respective prescribed values, and after said prescribed levels have been reached, all light sources except one are turned off and then the light beam from the remaining light source which is on is detected by said optical sensor to effect start synchronization.

3. An image exposing apparatus for scanning an image on a light-sensitive material having a main scanning direction, and having a plurality of light sources that turn on or off, comprising:

a light deflector having a plurality of faces;

said plurality of light sources emit light beams of different wavelengths in narrow bands so as to be incident at different angles but at substantially a single location on one of said reflecting faces of said light deflector, the incident light beams being reflected and deflected to scan sequentially at predetermined time intervals in the main scanning direction and to thereby define a main scanning line;

an fθ lens for focusing said light beams on said main scanning line; and an optical sensor for receiving said light beams when said light beams are disposed outside said light-sensitive material to achieve start synchronization for said main scanning line;

wherein at least one member selected from among said light deflector and said fθ lens is arranged between said light sources and said optical sensor to permits only one of said plurality of light beams to be admitted into said optical sensor to effect start synchronization and other light beams will be blocked by at least one member selected from among an edge of a reflecting face of said light deflector and an edge of said fθ lens, whereby other beams will not be admitted into said optical sensor.

4. An image exposing apparatus according to claim 1 wherein said optical sensor is a dual segmented optical sensor.

5. An image exposing apparatus according to claim 2, wherein said optical sensor is a dual segmented sensor.

6. An image exposing apparatus according to claim 3, wherein said optical sensor is a dual segmented sensor.

7. An image exposing apparatus for scanning an image on a light-sensitive material having a main scanning direction, and having a plurality of light sources that turn on or off, comprising:

a light deflector having a plurality of faces;

with plurality of light sources that emit light beams of different wavelengths in narrow bands so as to be incident at different angles but at substantially a single location on one of said reflecting faces of said light deflector, the incident light beams being reflected and deflected to scan sequentially at predetermined time intervals in the main scanning direction and to thereby define a main scanning line;

an fθ lens for focusing said light beams on said main scanning line;

an optical sensor for receiving said light beams when said light beams are disposed outside said light-sensitive material to achieve start synchronization for said main scanning line; and a blocking means for allowing only one of said plurality of light beams to be admitted into said optical sensor and other light beams to be blocked, whereby said other beams are not admitted into said optical sensor to effect start synchronization, and said blocking means being disposed between said light sources and said optical sensor.

8. An image exposing apparatus according to claim 7, wherein said optical sensor is a dual segmented sensor.

* * * * *